Nov. 29, 1966  C. B. BRAHM ET AL  3,287,965
ENGINE PERFORMANCE INDICATOR
Filed Sept. 27, 1963  4 Sheets-Sheet 1

INVENTORS
CHARLES B. BRAHM
RONALD A. HAVERL

BY
ATTORNEY

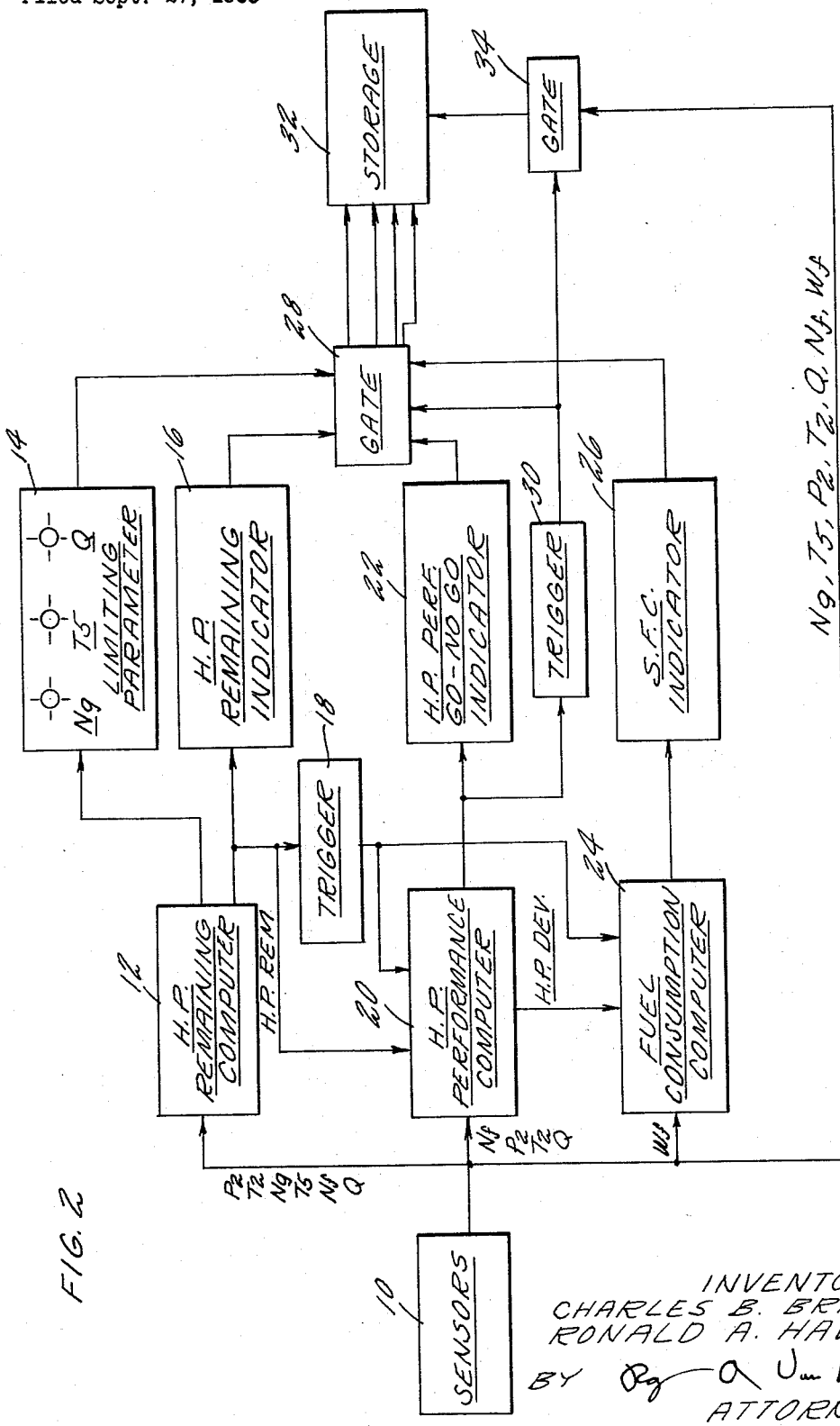

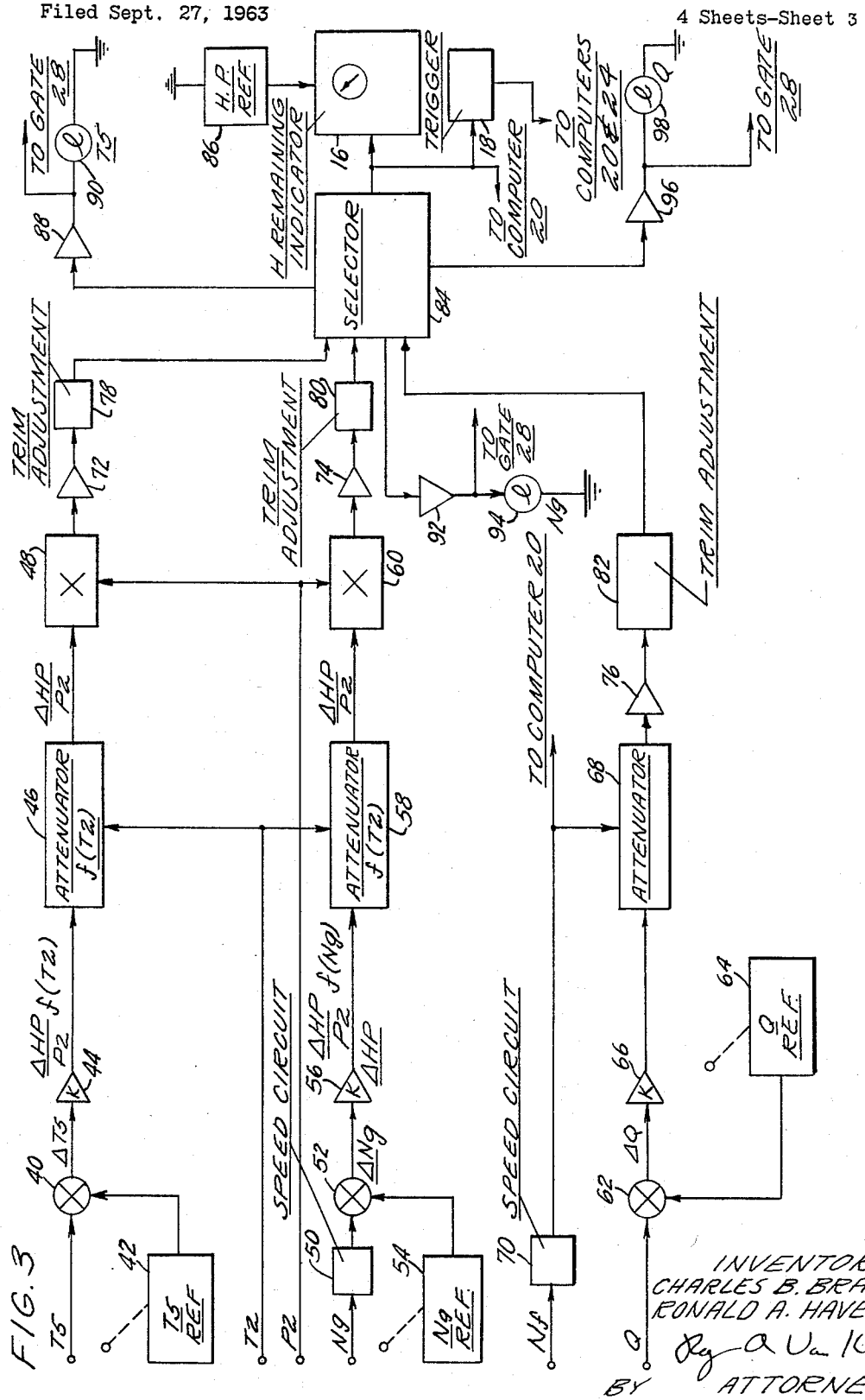

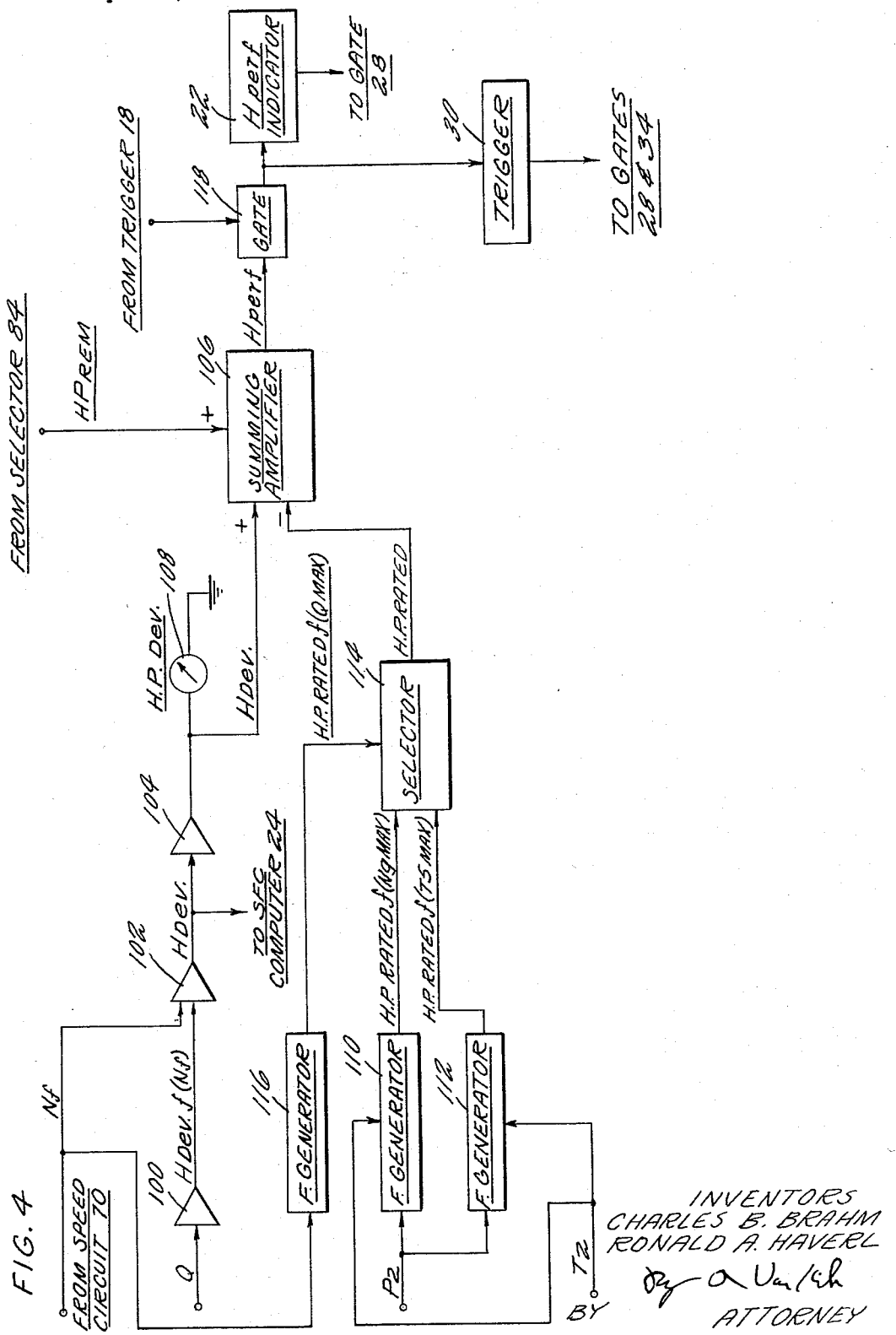

United States Patent Office 3,287,965
Patented Nov. 29, 1966

3,287,965
ENGINE PERFORMANCE INDICATOR
Charles B. Brahm, Ellington, and Ronald A. Haverl, Vernon, Conn., assignors to United Aircraft Corporation, East Hartford, Conn., a corporation of Delaware
Filed Sept. 27, 1963, Ser. No. 312,081
11 Claims. (Cl. 73—116)

This invention relates to an engine performance computer for a gas generator. More particularly, this invention is directed to a device which permits the pilot of a turbine-powered craft to instantaneously ascertain critical information concerning his engine and which, should his engine fail to come up to its rated performance, measures and stores data relating to engine performance so as to facilitate analysis of trouble when the pilot returns to his base.

There has long been a need for a device which would calculate and display certain critical data indicative of the performance of a gas turbine power plant. There has also long been needed a presentation of data which would influence the pilot of such craft in making a decision as to whether to execute a particular maneuver. For example, in operating a gas turbine power plant, the pilot must avoid exceeding the prescribed limits for engine r.p.m., temperature of the discharge from the gas generator portion of the power plant and output shaft torque. Further, if these parameters are limited by other devices, such as the fuel control, the pilot must know the available margin of the individual limit at the instant of making a decision for power addition. For example, in executing a maneuver such as landing a helicopter on a pitching deck, the pilot must be able to instantly ascertain that if he pulls up on the collective stick he will get the power required to lift his craft to a safe position should a wave suddenly lift the ship. Along with this indication of power remaining, it is also desirable that the pilot know whether his engines are living up to their rated performance. That is, when the pilot finds he has insufficient power remaining to execute a desired maneuver, it is important for him to have an indication of whether the lack of remaining power is due to an engine malfunction rather than some other condition such as overloading. Similarly, it is generally important for the pilot to be able to ascertain his specific fuel consumption. As is well known, specific fuel consumption is an indication of the condition and performance of the engine.

In the situation where the pilot has insufficient power remaining to perform the desired maneuver and receives an indication that his engine is not living up to its rated performance, it is extremely important to note all the engine operating parameters. For example, considering the condition of excessive losses due to bearing friction, an indication that the engine is not delivering its rated power may not be due to an engine malfunction but rather due to a low oil level. However, when the pilot returns to base and reports an inability to obtain rated performance from his engine, the normal recourse would be to change the engine. In accordance with this invention, should the engine fail to live up to rated performance, all the pertinent measurable engine parameters will be sensed and stored in a memory device so that upon return to base the ground crew may feed the data into a computer and quickly determine whether the engine should be removed and replaced with a spare. In the prior art, many of the significant engine performance quantities computed by this invention were not available to the pilot and the other quantities had to be read from dials and listed individually by the pilot. Due to the added difficulties in flying the craft at such time, it was virtually impossible for the pilot to note each of the parameters previously measured and individually displayed. This was particularly true on multi-engine craft.

This invention fulfills the above-discussed needs by providing a computer and associated indicating instrument which will furnish the pilot of a turbine-powered craft with instantaneous information concerning: (1) the remaining horsepower available from his engine, (2) which of the critical engine parameters is limiting the remaining horsepower, (3) an indication of the proximity of his engine's performance to its rated performance and (4) an indication of the specific fuel consumption of his engine. This invention also comprises means which, should an engine fail to give at least a preselected percentage of its rated performance, will sense and store all the pertinent operating condition parameters.

It is therefore an object of this invention to provide an engine performance computer.

It is another object of this invention to provide an indication of the proximity of the performance of a gas generator to its rated performance.

It is also an object of this invention to provide an indication of the specific fuel consumption of a gas generator.

It is a further object of this invention to provide for the recording of engine operating parameters when a gas generator fails to match its rated performance.

These and other objects of this invention are accomplished by an engine performance computer and indicating system which senses power limiting engine parameters and ambient conditions and uses the sensed parameters and conditions to calculate horsepower remaining; horsepower performance, which is a comparison of rated maximum power for the ambient conditions to actual maximum power available; and specific fuel consumption. When the maximum horsepower available is less than a preselected percentage of the rated horsepower for the ambient conditions, all of the sensed parameters and conditions as well as the computed quantities and an indication of which parameter which is limiting the remaining horsepower available from the engine will read into a storage device.

This invention may be better understood and its numerous advantages will become apparent to those skilled in the art by reference to the accompanying drawing wherein like reference numerals refer to like elements in the various figures and in which:

FIGURE 2 is a block diagram of the engine performance computer which comprises this invention.

FIGURE 3 is a block diagram of the horsepower remaining computer and indicator of the device shown in FIGURE 2.

FIGURE 4 is a block diagram of the horsepower performance computer of the device shown in FIGURE 2.

Figure 1:
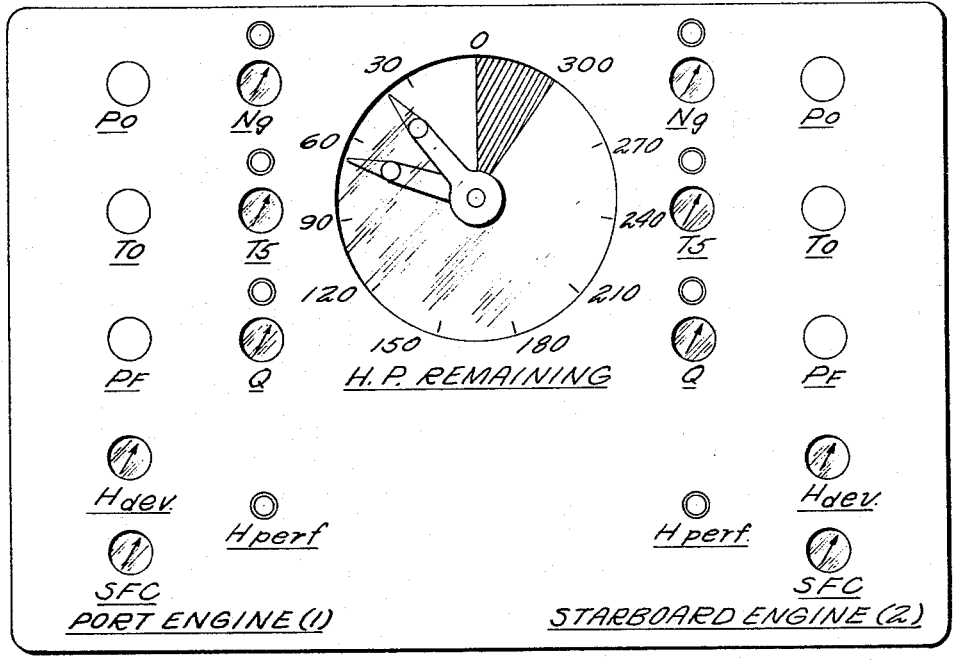
FIGURE 1 is a representation of how the indicator of this invention might be arranged when the invention is employed on a twin-engine craft.
Figure 5:
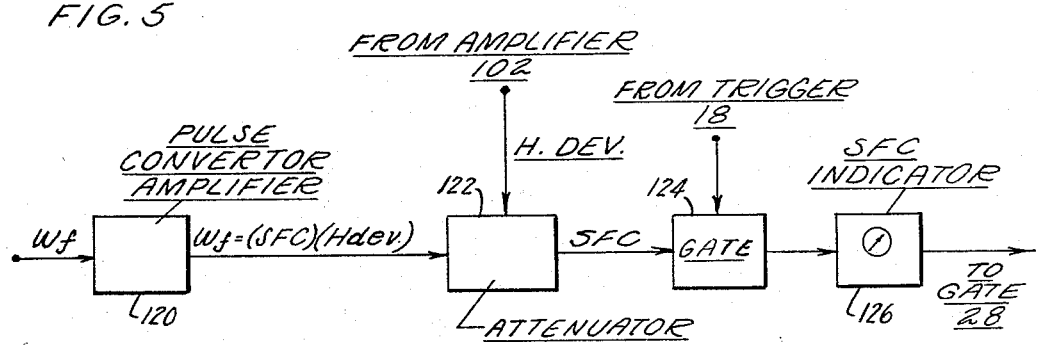
FIGURE 5 is a block diagram of the specific fuel consumption computer of the device shown in FIGURE 2.

While not limited thereto, this invention will be described in connection with computing and indicating the performance of a turbine engine consisting of a gas generator driving a free turbine which is in turn connected to a load such as the rotor of a helicopter, through appropriate gearing. The instrument utilizes T5, gas generator discharge temperature; T2, gas generator compressor inlet temperature; Ng gas generator turbine speed; $N_f$ free turbine speed; Q, the torque developed by the free turbine; P2, the gas generator compressor inlet pressure; and $W_f$, the mass fuel flow to the gas generator, to calculate horsepower remaining, horsepower performance and specific fuel consumption. The above listed quantities are sensed by devices, well known in the art, which are presently included on most production type gas generators. The indicator shown in FIGURE 1 is designed for use with a twin-engine craft and thus comprises dual banks of meters for indicating certain critical engine operating conditions. That is, for each engine a separate meter is provided for indicating engine oil temperature, $T_o$; engine oil pressure, $P_o$; engine fuel pressure, $P_f$; $N_g$; T5; Q; horsepower developed; and specific fuel consumption. The horsepower remaining indicator comprises a two-movement meter thereby providing a single display which readily enables the pilot to ascertain the remaining horsepower available from each engine.

ENGINE PERFORMANCE COMPUTER

Referring now to FIGURE 2, the engine performance computer and indicator which comprises this invention is shown in block form. In FIGURE 2, in the interest of clarity, all of the engine mounted sensors are shown as a single block 10. However, it is to be understood that, for each engine, there will be an individual sensor for $N_g$, $N_f$, T2, T5, P2, Q, and $W_f$. Devices for sensing these quantities are well known in the art and, as mentioned above, are presently included on production-type gas turbine engines. Electrical signals generated by the $N_g$, $N_f$, T2, T5, P2 and Q sensors are applied to a horsepower remaining computer 12. As will be explained in detail below, horsepower remaining computer 12 operates on the sensed engine operating parameters to produce an indication of actual horsepower remaining available from the gas generator. The horsepower remaining computer 12 also provides an indication of which of three parameters; gas generator speed, gas generator discharge temperature or torque developed by the free turbine; is the closest to its maximum permissible value and is thus limiting the horsepower available. The one of these three limiting parameters which is at any instant controlling horsepower remaining is selected and applied to an indicator 14. Thus, the pilot may instantaneously determine which of the three power-limiting engine parameters is at any instant closest to its maximum permissible value.

The computed value of actual horsepower remaining available from the gas generator is applied to a horsepower remaining indicator 16 which would typically be one movement of a two-movement meter such as that shown in FIG. 1. The signal corresponding to actual horsepower remaining is also applied to a trigger circuit 18 and to a horsepower performance computer 20. Signals from the free turbine speed sensor, the gas generator inlet pressure sensor, the gas generator inlet temperature sensor and the free turbine torque sensor are also applied to the horsepower performance computer 20. Computer 20, in the manner to be described below, uses the four sensed parameter inputs and the calculated actual horsepower remaining to provide a signal which is a comparison of the maximum horsepower that the gas generator can develop to the rated maximum horsepower that the gas generator should be able to develop for the ambient conditions. In order to improve the accuracy of the horsepower performance computer 20, the output therefrom is only utilized over a narrow range. The foregoing is accomplished by applying the horsepower performance signal produced by horsepower performance computer 20 to a horsepower performance indicator 22 only when the horsepower remaining falls below a preselected minimum value. This minimum value can be selected by adjusting the firing point of trigger 18 so that it produces an output signal only when the actual horsepower remaining signal from computer 12 falls below a certain value. The output of trigger 18 is applied to horsepower performance computer 20 wherein it controls a gate circuit which normally blocks the output of computer 20 from indicator 22.

In the course of computing the horsepower performance ratio, horsepower remaining computer 20 produces a quantity proportional to the actual horsepower developed. This quantity along with the mass fuel flow, $W_f$, sensed by an engine mounted flowmeter, is applied to fuel consumption computer 24. Fuel consumption computer 24, in the manner to be described below, utilizes these two inputs to provide an indication of the specific fuel consumption. As with horsepower performance computer 20, in order to improve accuracy, the output of fuel consumption computer 24 is applied to the specific fuel consumption indicator 26 only when the actual horsepower remaining is less than the pre-selected minimum value. Accordingly, the output of trigger circuit 18 is also applied to specific fuel consumption computer 24 wherein it controls the operation of a gating circuit which normally blocks the output of fuel consumption computer 24 from specific fuel consumption indicator 26.

The output signals from horsepower remaining computer 12, through the indicators 14 and 16; the output of horsepower performance computer 20, through indicator 22; and the output of fuel consumption computer 24, through indicator 26; are applied to a gating circuit 28. Thus, gating circuit 28 has applied thereto as information inputs the actual horsepower remaining, the limiting parameter and its value, the horsepower performance comparison and the specific fuel consumption. The control signal for gating circuit 28 is supplied by a trigger circuit 30. The input to trigger circuit 30 is the horsepower performance signal developed by horsepower performance computer 20. Trigger circuit 30 may be adjusted so that it will provide a gating signal at its output terminals only when the horsepower performance signal is less than a pre-selected value. For example, trigger circuit 30 may provide a gating signal for gating circuit 28 only when the output from horsepower performance computer 20 indicates that the gas generator will provide less than 90 percent of its rated horsepower for the ambient conditions. Therefore, in the case where the gas generator will not deliver more than 90 percent of its rated horsepower, gating circuit 28 will be activated and the horsepower remaining, limiting parameter, horsepower performance ratio and specific fuel consumption signals will be passed to a storage device 32. Storage device 32 may be any type of memory unit known in the art and preferably will include analog to digital converter circuits for converting the inputs thereto into digital form which are then stored in the memory. Also applied to storage device 32, through a gating circuit 34, are the seven sensed engine operating parameters provided by sensors 10. Gating circuit 34, like gating circuit 28, is controlled by the output of trigger 30 so that the seven sensed parameters will be stored only under a condition where the gas generator is failing to provide at least 90 percent of its rated horsepower.

HORSEPOWER REMAINING COMPUTER

As discussed above, the horsepower remaining computer 12 of FIG. 2 utilizes T2, gas generator compressor inlet temperature; T5, tailpipe or gas generator discharge temperature; $N_g$, gas generator turbine speed; $N_f$, free turbine shaft speed; P2, gas generator compressor inlet pressure; and Q, the torque developed by the free turbine, to determine the actual horsepower remaining. It should be noted that the quantities T2 and P2 are, particularly in the operation of a helicopter, nearly equal to the ambient conditions. That is, with a helicopter, the ram effect is negligible and thus the ambient conditions rather than the compressor inlet conditions may be sensed and utilized as the engine inlet operating parameters in the device of this invention. As shown in FIG. 1, the scale of the indicator displays actual horsepower remaining. The indicator shown in FIG. 1 is designed for use with a twin engine craft and thus comprises a two movement meter thereby providing a single display showing the power remaining in each engine. Use of a two movement meter also has the added advantage of presenting the pilot with an indication as to whether his engines are developing equal amounts of power. It is desirable to maintain load sharing between engines on a multi-engine craft in order to subject each engine to equal wear at the point of going to overhaul.

From the block diagram, FIG. 3, the operation of the horsepower remaining computer portion of the present invention can be seen. As indicated above, the maximum horsepower which a gas generator can develop is limited by the engine inlet operating conditions and the maximum permissible gas generator discharge temperature, gas generator speed, and free turbine shaft torque. Thus, in order to accurately compute horsepower remaining, it is necessary to calculate horsepower remaining as a function of T5, N$g$, and Q. Thereafter, the one of the three horsepower remaining signals indicative of the least horsepower remaining will be gated to the indicator. To accomplish the foregoing, three computations channels are preferably employed in the horsepower remaining computer of the present invention. The first channel computes horsepower remaining as a function of gas generator discharge temperature, T5, and has as inputs thereto the signals developed by an engine mounted gas generator discharge temperature sensor and sensors which measure the gas generator inlet temperature, T2, and inlet pressure, P2. The second computation channel computes horsepower remaining as a function of gas generator speed, N$g$, and accordingly has as inputs thereto the signals developed by a gas generator tachometer and the T2 and P2 sensors. The third computation channel derives a signal proportional to horsepower remaining as a function of free turbine shaft torque and has as inputs thereto the output of a free turbine mounted torque sensor and a free turbine tachometer. The horsepower remaining signals from the three channels are applied as inputs to a selector circuit which, as will be described more fully below, may be either a Least or a Most Gate. The selector circuit will pass the signal indicative of the least horsepower remaining to indicator 16 as shown in FIG. 2. Applied to the indicator 14 (FIG. 2), for the purpose of activating a visual or oral indicator, will be a signal indicative of which of the power limiting opearting parameters is at that instant limiting the remaining horsepower available.

Referring again to FIG. 3, the horsepower remaining computer which comprises the three computation channels and the selector circuit is shown in detailed form. As mentioned above, the T5 channel of the horsepower remaining computer receives its inputs signal from a gas generator discharge temperature sensor which may be an engine mounted thermocouple. This T5 signal is compared in a different circuit 40 with a T5 reference signal from reference voltage source 42. The T5 reference voltage is initially adjusted to be equal to the actual T5 signal generated by the engine mounted sensor at the maximum permissible gas generator tailpipe temperature. The output from difference circuit 40 is thus zero volts at the maximum permissible gas generator discharge temperature and increases as the difference between maximum and actual T5 increases. This difference voltage, for a constant engine T2, is proportional to horsepower remaining divided by compressor inlet pressure, P2. The output of difference circuit 40, ΔT5, is amplified in amplifier 44 and applied to a circuit 46 containing an attenuation which is a function of T2 as measured by the T2 sensor. The function of attenuation circuit 46 is to provide compensation for variations in the ambient temperature. Such compensation is needed since the relationship between power remaining and maximum permissible gas generator discharge temperature varies to some extent with the ambient or gas generator compressor inlet temperature, T2. That is, the slope of the T5 versus horsepower remaining curve plotted for a gas generator is different for each value of T2. Thus, the accuracy of the computer may be significantly improved by providing T2 compensation. The desired compensation is accomplished by multiplying the T5 difference voltage, ΔT5, from amplifier 44 by the T2 sginal. Through this multiplication, the slope of the ΔT5 voltage is caused to vary with T2 and compensation for variations in the slope of $$\frac{\Delta T5 \text{ vrs. H.P. Remaining}}{P2}$$

curve with T2 fluctuations is achieved. The output of attenuation circuit 46, accordingly, is proportional to horsepower remaining divided by the compressor inlet pressure and is independent of compressor inlet temperature. In order to provide a signal proportional to horsepower remaining and independent of compressor discharge pressure, it is necessary to multiply the output of attenuator circuit 46 by a signal proportional to the ambient or compressor inlet pressure. While this multiplication may be accomplished in various ways, in the interest of clarity the output of attenuation circuit 46 and a signal proportional to P2 are shown applied to a multiplication circuit 48. The output of multiplication circuit 48 is thus a signal proportional to true absolute horsepower remaining as a function of gas generator discharge temperature. The equations for the horsepower remaining computation performed by the T5 channel are as follows:

(1)    $T5 \text{ max} - T5 \text{ actual} = \Delta T5$ $$\Delta T5 = \frac{\Delta H.P.}{P2} f(T2) = \frac{\Delta H.P.}{\delta 2}\bigg|\Delta T5\bigg|T2 = k$$

Where ΔH.P.=actual horsepower remaining $$\delta 2 = \frac{P2}{14.7}$$

(2) After T2 compensation, $$\Delta T5 = \frac{\Delta H.P.}{P2}$$

(3)    $$\frac{\Delta H.P.}{P2} \times P2 = \Delta H.P. f(T5)$$

The N$g$ or gas generator speed channel is driven by a signal from an N$g$ tachometer. The tachometer output signal is applied to a speed circuit 50. Speed circuit 50 senses a change in tachometer frequency and puts out a D.C. voltage proportional to frequency which in turn is proportional to speed. A circuit with these characteristics is disclosed in co-pending Application Serial No. 54,073, filed September 6, 1960, by Henry E. Martin, entitled Speed Responsive Control System, now U.S. Patent No. 3,119,055 issued January 21, 1964, and assigned to the same assignee as the present invention. The output of speed circuit 50 is applied to a difference circuit 52 wherein it is compared to a pre-set N$g$ reference voltage from N$g$ reference voltage source 54. The voltage provided by source 54 is initially adjusted so as to be proportional to the maximum permissible gas generator speed. The output of difference circuit 52 is thus zero at maximum permissible N$g$ and increases as actual N$g$ decreases below its upper limit. The N$g$ difference signal, for a constant engine T2, is proportional to horsepower remaining divided by compressor inlet pressure and is designated as $$\Delta Ng = \frac{\Delta H.P.}{\delta 2}\bigg|\Delta Ng\bigg|T2 = K$$

This signal is amplified in amplifier 56 and is applied to an attenuation circuit 58 containing an attenuation which is a function of T2 as measured by the T2 sensor. Since the slope of the $$\frac{Ng \text{ vrs. Horsepower Remaining}}{P2}$$

curve also varies with compressor inlet temperature, T2 compensation is desirable in the N$g$ channel. This compensation is accomplished in the same manner as described above in relation to the T5 channel. Attenuator circuit 58 functions in the same manner as attenuator circuit 46 to multiply the $\Delta Ng$ signal by the T2 signal to thereby provide a resultant signal proportional to actual horsepower remaining divided by compressor inlet pressure. As with the T5 channel, the output of the attenuator 58 is applied to a multiplication circuit 60 wherein it is multiplied by the P2 signal to provide a signal proportional to horsepower remaining as a function of $Ng$. The equations for the horsepower remaining computation performed in the $Ng$ channel are as follows:

(1) $\quad Ng\ \max - Ng\ \text{actual} = \Delta Ng$ $$\Delta Ng = \frac{\Delta \text{H.P.}}{P2} f(T2) = \frac{\Delta \text{H.P.}}{\delta 2} \bigg| \Delta Ng \bigg| T2 = K$$

Where $\Delta$H.P.=actual horsepower remaining $$\delta 2 = \frac{P2}{14.7}$$

(2) After T2 compensation, $$\Delta Ng = \frac{\Delta \text{H.P.}}{P2}$$

(3) $\quad \dfrac{\Delta \text{H.P.}}{P2} \times P2 = \Delta \text{H.P.} f(Ng)$

The torque developed by the gas generator is sensed and applied to a difference circuit 62. In a typical installation, the torque may be sensed in the following manner. The torque delivered by the free turbine through the gear box produces an axial thrust on a second stage helical gear. This force is balanced out by hydraulic pressure in a force balance, closed loop configuration that forces the axial displacement of the helical gear to a known position. The balance pressure is a direct measure of delivered torque. Balance pressure is sensed by a pressure transducer and converted to an electrical signal which is applied to difference circuit 62. In difference circuit 62, the actual torque developed by the free turbine is compared with a torque reference voltage provided by reference voltage source 64. As with the T5 and $Ng$ channels, the torque reference voltage is set so that at maximum permissible torque the difference voltage from circuit 62 is zero. As the torque decreases from maximum, the difference voltage from circuit 62 will increase. The output of difference circuit 62 is substantially inversely proportional to actual horsepower remaining. However, even with isochronous governing of the gas generator, there will be some variation in the speed of the free turbine. Since maximum obtainable torque or horsepower is dependent upon free turbine speed, $N_f$, it may be desirable to correct the output of the torque error signal circuit 62 for changes in free turbine speed. Accordingly, if desired, after amplification in an amplifier 66, the torque error signal, $\Delta Q$ may be applied to an attenuator 68 in order to modify this signal as a function of free turbine speed. Also applied to attenuator 68 is the output of a speed circuit 70. Speed circuit 70 receives as its input the output of free turbine mounted tachometer and generates an output voltage proportional to $Ng$. The output of attenuator 68 is thus an extremely accurate signal proportional to horsepower remaining as a function of torque developed by the free turbine.

The horsepower remaining signals from multipliers 48 and 60 and attenuator 68 are respectively applied to amplifiers 72, 74 and 76. The outputs of these three amplifiers, which are any well-known type of amplifier which will produce a relatively negative output voltage, are respectively applied to trim adjust circuits 78, 80 and 82. In the trim adjust circuits the horsepower remaining signals are each offset by trim voltages so that the sum of the horsepower remaining signal and offset voltage is zero volts at a pre-selected amount of horsepower remaining and a maximum voltage when the limiting parameter is at its limiting value. That is, when T5, $Ng$ or Q is at its maximum permissible value, there will be no input to its associated horsepower remaining computation channel from the associated difference circuit and accordingly no output from amplifiers 72, 74 or 76. Under these circumstances, the trim voltage will appear at the output of the associated trim adjust circuits 78, 80 or 82. A description of a trim adjust circuit adapted to perform in the above-described manner may be found in copending application Serial No. 255,815, filed February 4, 1963 by C. B. Brahm et al., now U.S. Patent No. 3,181,353 issued May 4, 1965, and assigned to the same assignee as this invention. More particularly, a trim adjust circuit is shown as 42 in FIG. 2 of U.S. Patent No. 3,181,353. Thus, the magnitude of the outputs from trim adjust circuits 78, 80 and 82 will vary directly with the actual horsepower remaining as a function of T5, $Ng$ and Q respectively.

The outputs of the three trim adjust circuits are applied to a selector circuit 84. Circuit 84 functions as a Most Gate such that the input having the greatest magnitude is passed to a horsepower remaining indicator 16. A suitable Most Gate is described in the explanation of FIG. 3 of above-referenced U.S. Patent No. 3,181,353. It should be recognized however that the use of a Most Gate is described by way of illustration only and that other circuits for achieving the same function may be utilized without deviating from the scope of this invention. For example, a diode Least Gate of the type well known in the art may be connected directly to the outputs of multipliers 48 and 60 and attenuator 68. In the embodiment being described the selected or largest of the horsepower remaining signals will be applied by selector circuit 84 to horsepower remaining indicator 16. A zero horsepower remaining level is set up as a reference voltage on one side of the meter movement of indicator 16 by adjusting a potentiometer in reference voltage source 86. The signal selected by circuit 84 is compared to the reference voltage from source 86. The difference between the selected signal and the reference voltage will drive the meter movement and will thus position a pointer on the face of the meter against a backdrop of a scale calibrated to indicate horsepower remaining. The meter illustrated in FIG. 1, for example, is calibrated in terms of true absolute horsepower remaining from 300 H.P. to zero. The instrument thus is readable over a range of 20 percent horsepower remaining for a production type gas generator rated at 1450 horsepower for standard conditions.

As shown in FIG. 3 of U.S. Patent No. 3,181,353, through the operation of the Most Gate, selection of one of the three horsepower remaining signals will cause the biasing on of an amplifier associated with the selected input channel. Thus, should T5 be the limiting engine operating parameter, an amplifier 88 will be biased on causing current to flow through a lamp 90 of indicator 14. The turning on of lamp 90 will provide an easily observable indication to the pilot that T5 is the parameter limiting the horsepower available from his engine. The output of amplifier 88 is also applied as an input to gating circuit 28 so that, when necessary, it can be read into the memory device 32 as described above. Similarly, should $Ng$ be the limiting parameter, selector circuit 84 will operate to bias on amplifier 92 and lamp 94 while, should torque be the limiting parameter, amplifier 96 and lamp 98 will be activated. As with the output from amplifier 88, when activated, the outputs of amplifiers 92 and 96, when supplied with input signals, will be applied to gating circuit 28. The horsepower remaining signal selected by selector circuit 84 is, simultaneously with its application to indicator 16, applied to the horsepower performance computer 20 and to trigger circuit 18. Trigger circuit 18, which may be a bistable multivibrator, will produce an output signal which will be applied to the gating circuits in the horsepower performance and specific fuel consumption computers when the selected horsepower remaining signal exceeds a pre-selected value indicative of, for example, less than 5 percent horsepower remaining.

It should, of course, be understood that various modifications of the horsepower remaining computer portion of this invention may be made without departing from the spirit and scope thereof. For example, it may be deemed desirable to eliminate multiplication circuits 48 and 60 and to transmit the outputs of attenuators 46 and 58 to a selector gate. The selection gate will choose the Ng or T5 signal representing the lowest power remaining and transmit this signal as an excitation signal to a P2 pressure transducer. Multiplication by P2 will inherently be performed by the pressure transducer and the output thereof, along with the torque channel output from attenuator 68, may be applied to a second selector gate. The latter arrangement is shown in FIG. 4 of copending application Serial No. 306,174 filed September 3, 1963 by R. Haverl and assigned to the same assignee as this invention.

HORSEPOWER PERFORMANCE COMPUTER

As mentioned above, engine horsepower performance is a parameter which actuates an indicator 22 to tell the pilot if an engine's performance is within acceptable limits. In order to measure the performance of a gas generator, it is necessary to compute horsepower developed which is then added to the horsepower remaining signal developed by horsepower remaining computer 12. It is also necessary to compute the rated horsepower for the ambient conditions and subtract this quantity from the sum of horsepower remaining and horsepower developed. Since horsepower is a product of torque multiplied by speed, where the maximum allowable torque is a constant, the horsepower developed is computed by multiplying the sensed value of torque developed by the free turbine by the sensed value of free turbine speed. Referring to FIG. 4, the output of the free turbine-mounted sensor which measures torque is amplified by an amplifier 100. The output of amplifier 100 is a signal proportional to horsepower developed as a function of free turbine speed. This signal, together with the signal proportional to free turbine speed from speed circuit 70 of FIG. 3, is applied to a linear amplifier 102 which performs the above-mentioned multiplicaion over the limited speed range necessary. The output of amplifier 102 is thus a signal proportional to horsepower developed. This horsepower developed signal is applied to specific fuel consumption computer 24 and to amplifier 104. The output of amplifier 104 is applied as one input to summing amplifier 106 and is also applied to a horsepower developed indicator 108.

As is well known in the gas generator art, the rated horsepower of a gas generator varies with the ambient conditions. Thus, for each production type turbine engine, curves are plotted for the maximum horsepower as a function of both compressor inlet temperature and compressor inlet pressure. The rated horsepower for these ambient conditions is based on inherent limitations of maximum gas generator speed and maximum gas generator discharge temperature which may not be exceeded. Thus, Ng and T5 fix the upper limits of the families of curves plotted for P2 and T2. While the theoretical derivation of these curves is omitted herein for convenience, it must be noted that such derivations are well known in the art, are plotted for all gas generators as a matter of course and have been long used in the designing of three dimensional cams for use in hydromechanical fuel controls. A showing of the type of curves being discussed may be found in FIG. 8 of U.S. Patent No. 2,910,125 issued October 27, 1959 to S. G. Best. The P2 and T2 signals provided by the engine-mounted sensors 10 are applied to each of function generators 110 and 112. The exact circuitry of these function generators is not shown herein since they will vary from engine type to engine type. However, function generator 110 will typically be a diode shaping circuit of a type well known in the art which will produce an output signal proportional to the rated horsepower of the gas generator as a function of gas generator speed for the ambient conditions. Function generator 112 will be a similar circuit which will produce an output signal proportional to the rated horsepower as a function of maximum allowable gas generator discharge temperature for the ambient conditions. The rated horsepower signals from function generators 110 and 112 are applied as inputs to a selector circuit 114. Also applied to selector circuit 114 is a signal proportional to the rated horsepower as a function of maximum allowable torque. The latter signal is generated by function generator 116. The rated horsepower, considering torque as the only limit, is practically a constant except for a minor variation with actual free turbine speed. Thus, function generator 116 has, as an input thereto, the $N_f$ signal from speed circuit 70. Function generator 116 may simply be a proportional amplifier whose gain varies with the magnitude of the $N_f$ signal.

Selector circuit 114 will typically be a diode Least Gate of a type well known in the art which selects and transmits the lowest of the three rated horsepower signals to summing amplifier 106. As mentioned above, the horsepower performance comparison is accomplished in summing amplifier 106 by adding the horsepower remaining and horsepower developed signals to provide a signal proportional to the total horsepower which the gas generator can at that instant develop. The horsepower rated signal from selector 114 is subtracted from the latter signal to produce a voltage indicative of the proximity of the gas generators actual performance to its rated performance. Should the output of summing amplifier 106 be a negative signal, it is an indication that the rated horsepower exceeds the actual maximum horsepower performance of the engine. When this negative signal exceeds a preselected value indicative of, for example, a condition where the gas generator will not provide 90 percent of its rated horsepower, a signal will be available at the input to gating circuit 118. This signal will, if passed by gating circuit 118, activate trigger circuit 30. The control signal for gating circuit 118, as mentioned above, is provided by trigger circuit 18 of the horsepower remaining computer. Thus, should the horsepower remaining be less than a pre-selected minimum critical value, the horsepower performance signal will be passed by gating circuit 118 to a horsepower performance indicator 22. Horsepower performance indicator 22 will, in a preferred embodiment, consist merely of a warning light which provides the pilot with a go-no-go warning. This warning light, which may be a neon indicator, will only fire when the horsepower performance voltage exceeds a pre-selected level. The horsepower performance signal will also be applied, through indicator 22, to gating circuit 28 so that it will be available for storage in storage device 32. The horsepower performance signal, simultaneously with its being gated to indicator 22, is applied to trigger circuit 30. Should the horsepower performance of the gas generator be sufficiently deficient, as indicated by the magnitude of the voltage passed by gate 118, trigger circuit 30, which may be a bistable multivibrator circuit, will produce an output voltage which will turn on gates 28 and 34 of FIG. 2 to thereby cause all the sensed and computed quantities to be stored in storage device 32. In the usual case, the firing point of trigger 30 and the warning light in indicator 22 will be at the same potential.

SPECIFIC FUEL CONSUMPTION COMPUTER

Specific fuel consumption, SFC, measured in pounds per hour per horsepower, is computed from measured fuel flow and computed horsepower. A fuel flow signal, in the form of discrete pulses, is obtained from a turbine type flow meter, one of sensors 10, mounted on the gas generator. These pulses are shaped, filtered, and amplified by amplifier 120, which may be a well known type of pulse-converter amplifier, so that the resultant signal is an analog representation of fuel flow, $W_f$. By definition, $W_f$ equals specific fuel consumption multiplied by the horsepower developed. That is, $$W_f = (SFC)(H\ dev)$$

$$\therefore W_f \div H \text{ dev} = SFC$$

The required division by horsepower developed is preferably accomplished by a combined attenuation and biasing of the $W_f$ signal in attenuator circuit 122. However, any analog division circuit known in the art may be employed in place of attenuator 122. Attenuator circuit 122, in order to accomplish the foregoing, has applied as inputs thereto the $W_f$ signal from amplifier 120 and the horsepower developed signal from amplifier 102 of the horsepower performance computer. The computation of specific fuel consumption is facilitated by the fact that the instrument need only work over a limited range of horsepower developed. That is, the specific fuel consumption signal is passed by gating circuit 124 to specific fuel consumption indicator 126 only when the horsepower remaining is less than 40 percent. The foregoing is accomplished by gate 124, which is controlled by the output of the trigger circuit 18.

While a preferred embodiment of this invention has been shown and described, various modifications and substitutions may be made without deviating from the spirit and scope of this invention. For example, for many applications, it is possible to eliminate the torque channel from horsepower remaining computer 12 and still have a device of sufficient sensitivity and accuracy. Also, it should be understood that, for use with the instrument depicted in FIG. 1, two identical computers; one for each engine; such as that shown in FIG. 2 must be utilized. Thus, this invention is described by way of illustration rather than limitation and accordingly it is understood that this invention is to be limited only by the appended claims taken in view of the prior art.

We claim:

1. In combination with a gas generator having means associated therewith for sensing the values of and producing signals proportional to the load on, the conditions adjacent the inlet to and a plurality of power limiting operating parameters of the gas generator; said gas generator also having associated therewith a power remaining computer which, in response to the produced power limiting operating parameter signals, generates a signal commensurate with power remaining available from the gas generator; a power performance computer comprising:

first signal generating means responsive to the signal proportional to the load on the gas generator for generating a signal commensurate with the actual power being developed by the gas generator;

second signal generating means responsive to the signals proportional to the sensed values of the conditions adjacent the inlet to the gas generator for generating a signal commensurate with the rated power of the gas generator for said inlet conditions;

summing means responsive to said signals commensurate with power remaining, as provided by said power remaining computer, and actual developed power, as provided by said first signal generating means, for generating a signal commensurate with the actual power the gas generator can develop for the existing inlet conditions; and comparing means responsive to the signal commensurate with actual power which the gas generator can develop, as provided by said summing means, and to the signal commensurate with rated power, as provided by said second signal generating means, for generating a power performance signal commensurate with the proximity of the rated power to the actual power the gas generator can develop.

2. In combination with an engine, said engine having a gas generator portion comprising a turbine driving a compressor and a free turbine portion driven by the discharge from the gas generator and coupled to a load, said engine having means associated therewith for sensing the values of and producing signals proportional to free turbine shaft torque, free turbine speed, the conditions adjacent the inlet to the compressor and power limiting operating parameters of the engine; said engine also having associated therewith a power remaining computer which, in response to said power limiting operating parameter signals, generates a signal commensurate with the horsepower remaining available from the engine; an engine performance computer comprising;

means responsive to the signals indicative of the torque developed by and the speed of the free turbine for generating a signal commensurate with the horsepower being developed by the engine;

means responsive to the signals proportional to the sensed values of the conditions adjacent the inlet to the compressor of the gas generator portion of the engine for generating a signal commensurate with the rated horsepower of the engine for the sensed inlet conditions;

summing means responsive to the horsepower remaining signal, as provided by the horsepower remaining computer, and the developed horsepower signal for generating a signal commensurate with the actual horsepower the engine can that instant provide; and comparing means responsive to said signals commensurate with actual horsepower that can be developed and rated horsepower for the conditions adjacent the compressor inlet for generating a horsepower performance signal indicative of the proximity of the rated horsepower to the actual horsepower the engine can develop.

3. The apparatus of claim 2 wherein the means for generating a signal commensurate with rated horsepower for the conditions adjacent the compressor inlet comprises:

means responsive to the signals proportional to the sensed values of the conditions adjacent the inlet to the compressor for generating a signal commensurate with rated horsepower for said conditions as a function of the maximum permissible temperature of the discharge from the gas generator;

second means responsive to the signals proportional to the sensed values of the conditions adjacent the inlet to the compressor for generating a signal commensurate with rated horsepower for said conditions as a function of the maximum permissible rotational speed of the gas generator;

means responsive to the signal proportional to the sensed value of the speed of the free turbine for generating a signal commensurate with rated horsepower as a function of maximum permissible torque; and selector means responsive to said signals commensurate with rated horsepower as a function of maximum permissible gas generator discharge temperature, speed and torque for passing the one of said signals indicative of the lowest rated horsepower.

4. The apparatus of claim 3 wherein the means for generating the horsepower performance signal comprises:

means responsive to the horsepower remaining and horsepower developed signals for summing said signals to provide a signal commensurate with the total available horsepower the engine can at that instant provide; and comparator means responsive to the rated horsepower signal passed by said selector means and to said signal commensurate with total available horsepower for providing a signal indicative of the proximity of the rated horsepower to the total available horsepower.

5. A horsepower performance indicator for a free turbine engine, said engine having a gas generator portion comprising a turbine driving a compressor and a free turbine portion driven by the discharge from the gas generator, said engine having means associated therewith for sensing the values of and producing signals proportional to the torque developed by and the rotational speed of the free turbine, the pressure and temperature adjacent the inlet to the gas generator compressor, and power limiting operating parameters of the engine; said engine also having associated therewith a power remaining computer which, in response to said power limiting operating parameter signals, generates a signal commensurate with the power remaining available from the engine; said indicator comprisng:

means multiplying responsive to the signals proportional to the speed of and torque developed by the free turbine for generating a signal commensurate with the actual horsepower being developed by the engine;

means responsive to the signals proportional to pressure and temperature adjacent the compressor inlet for generating signals commensurate with the rated horsepower of the engine for the conditions adjacent the compressor inlet as a function of a plurality of engine power limiting operating parameters;

selector means responsive to said rated horsepower signals for passing the one of said signals indicative of the lowest horsepower rating;

summing means responsive to said horsepower developed and horsepower remaining signals for generating a signal commensurate with the actual horsepower the engine can develop for the existing inlet conditions;

comparing means responsive to said signal commensurate with actual horsepower that can be developed and to the rated horsepower signal passed by said selector means for generating a horsepower performance signal indicative of the proximity of the total actual horsepower the engine can at that instant develop to its rated horsepower; and means responsive to said horsepower performance signal for providing an indication of the horsepower performance of the engine.

6. The apparatus of claim 5 wherein the means for generating signals commensurate with rated horsepower comprises:

means responsive to the signals proportional to the sensed values of pressure and temperature adjacent the compressor for generating a signal commensurate with rated horsepower for said conditions as a function of the maximum permissible temperature of the discharge from the gas generator;

second means responsive to the said signals proportional to the sensed values of the pressure and temperature adjacent the inlet to the compressor for generating a signal commensurate with rated horsepower for said conditions as a function of the maximum permissible rotational speed of the gas generator; and means responsive to the signal poportional to the sensed value of the speed of the free turbine for generating a signal commensurate with rated horsepower as a function of maximum permissible torque.

7. The apparatus of claim 6 wherein the means for generating a rated horsepower signal as a function of maximum permissible temperature of the discharge from the gas generator comprises:

a function generator responsive to the signals proportional to the sensed values of the compressor inlet pressure and temperature for generating a signal commensurate with rated horsepower for the sensed temperature and pressure as a function of maximum permissible discharge temperature.

8. The apparatus of claim 7 wherein the second means for generating a rated horsepower signal as a function of maximum permissible rotational speed of the gas generator comprises:

a function generator responsive to the signals proportional to the sensed values of the compressor inlet pressure and temperature for generating a signal commensurate with rated horsepower for the sensed temperature and pressure as a function of maximum permissible gas generator rotational speed.

9. The apparatus of claim 8 wherein the means for providing an indication of horsepower performance comprises:

switch means having the horsepower performance signal from said comparator means applied as the input thereto and the horsepower remaining signal applied as the control signal therefor for passing said horsepower performance signal whenever the horsepower remaining is less than a preselected value; and means connected to said gating means and adapted to provide an indication of horsepower performance when said horsepower performance signal is passed by said switch means.

10. The apparatus of claim 8 further comprising:

means for sensing and generating signals proportional to a plurality of engine operating parameters;

a signal storage device;

means connected between said means for generating a plurality of engine operating parameter signals and said signal storage device for controlling the passage of said signals to said device; and means responsive to said horsepower performance signal for generating a control signal for said signal passage controlling means whenever the horsepower performance signal is indicative of a condition where the engine will not provide a pre-selected percentage of its rated horsepower whereby generation of said control signal will cause said engine operating parameter signals to be passed to said signal storage device by said signal passage controlling means.

11. An engine performance indicator for a free turbine engine, said engine having a gas generator comprising a turbine driving a compressor and a free turbine driven by the discharge from the gas generator; said engine having means associated therewith for sensing the values of and producing signals proportional to the torque developed by the free turbine, the conditions adjacent the inlet to the compressor, the rate of fuel flow to the engine, the rotational speed of the free turbine, and power limiting operating parameters of the engine; said engine also having associated therewith a power remaining computer which, in response to said power limiting operating parameter signals, generates a signal commensurate with the horsepower remaining available from the engine; said indicator comprising:

means responsive to the signal proportional to the torque being developed by the free turbine for generating a signal commensurate with the horsepower being developed by the engine;

means responsive to the signals proportional to the sensed values of the conditions adjacent the inlet to the compressor for generating a signal commensurate with the rated horsepower of the engine for said conditions as a function of a first power limiting operating parameter of the engine;

means responsive to the signals proportional to the sensed values of the conditions adjacent the inlet to the compressor for generating a signal commensurate with the rated horsepower of the engine for said conditions as a function of a second power limiting operating parameter of the engine;

means responsive to the signal indicative of the sensed value of the speed of the free turbine for generating a signal commensurate with the rated horsepower of the engine as a function of a third power limiting operating parameter of the engine;

selector means responsive to said signals commensurate with rated horsepower as a function of first, second and third power limiting parameters for passing the one of said signals indicative of the lowest horsepower rating;

summing means responsive to said remaining and developed horsepower signals for adding said signals to generate a signal commensurate with the actual horsepower the engine can develop for the existing inlet conditions;

comparing means responsive to said signal commensurate with actual horsepower that can be developed and the rated horsepower signal passed by said selector means for generating a horsepower performance signal indicative of the proximity of the sum of the remaining and developed horsepower to rated horsepower;

means responsive to the signal indicative of fuel flow rate and to said horsepower developed signal for generating a signal commensurate with specific fuel consumption;

means for sensing and generating signals proportional to a plurality of engine operating parameters;

a signal storage device;

normally open switch means having said engine operating parameter, horsepower remaining, horsepower developed, horsepower performance and specific fuel consumption signals applied thereto for passing said applied signals to said signal storage device; and means responsive to said horsepower performance signal and connected to said switch means for generating a switch control signal whenever the horsepower performance signal indicates that the engine will not provide a pre-selected percentage of its rated horsepower whereby generation of said control signal causes the signals applied to said switch means to be stored in said storage device.

References Cited by the Examiner
UNITED STATES PATENTS

| | | | |
|---|---|---|---|
| 2,941,399 | 6/1960 | Bersinger | 73—116 |
| 3,164,985 | 1/1965 | Arnot | 73—114 |
| 3,195,349 | 7/1965 | Hage | 73—116 |

JAMES J. GILL, *Primary Examiner.*

RICHARD C. QUEISSER, *Examiner.*

J. W. MYRACLE, *Assistant Examiner.*

UNITED STATES PATENT OFFICE
CERTIFICATE OF CORRECTION

Patent No. 3,287,965                      November 29, 1966

Charles B. Brahm et al.

It is hereby certified that error appears in the above numbered patent requiring correction and that the said Letters Patent should read as corrected below.

Column 13, line 43, before "compressor" insert -- inlet to the --; line 54, for "poportional" read -- proportional --.

Signed and sealed this 12th day of September 1967.

(SEAL)
Attest:

ERNEST W. SWIDER
Attesting Officer

EDWARD J. BRENNER
Commissioner of Patents